United States Patent [19]

Collings

[11] Patent Number: 5,641,952
[45] Date of Patent: Jun. 24, 1997

[54] ELECTRICAL ROTARY SWITCH

[75] Inventor: Reginald Jeffrey Collings, Winchombe, England

[73] Assignee: Delta Schoeller Ltd, England

[21] Appl. No.: 528,944

[22] Filed: Sep. 15, 1995

[30] Foreign Application Priority Data

Nov. 25, 1994 [GB] United Kingdom ............... 9423864

[51] Int. Cl.$^6$ ................. H01H 21/80; H01H 27/06
[52] U.S. Cl. .................. 200/11 R; 200/43.08; 200/316
[58] Field of Search ............................ 200/1 R, 1 A, 200/1 TK, 6 R, 6 B, 6 BA, 6 BB, 6 C, 11 R, 11 G, 11 K, 17 R, 18, 61.54, 52 R, 564, 568, 569, 43.06, 43.08

[56] References Cited

U.S. PATENT DOCUMENTS

| 3,562,464 | 2/1971 | Vollum et al. | 200/569 |
|---|---|---|---|
| 3,701,862 | 10/1972 | Vignini | 200/52 R X |
| 4,024,362 | 5/1977 | Morgan et al. | 200/1 TK |
| 4,154,991 | 5/1979 | Hickman et al. | 200/17 R |
| 4,273,971 | 6/1981 | Tregurtha | 200/61.54 X |
| 4,376,237 | 3/1983 | Long | 200/61.54 X |
| 4,395,609 | 7/1983 | Sowash | 200/6 B X |
| 4,647,734 | 3/1987 | Dana | 200/43.08 X |
| 4,803,313 | 2/1989 | Rolf | 200/6 BB |

FOREIGN PATENT DOCUMENTS

| 455423 | 11/1936 | United Kingdom . |
| 695125 | 8/1953 | United Kingdom . |
| 835048 | 1/1957 | United Kingdom . |
| 1577852 | 10/1980 | United Kingdom . |
| 2142186 | 1/1985 | United Kingdom ............. H01H 3/02 |

*Primary Examiner*—J. R. Scott

[57] ABSTRACT

An electrical rotary switch is disclosed having a rotary operating member (16) mounted for rotation about an axis. A first contact member (32) is mounted for movement in opposed directions along a path transverse to but not intersecting the axis, between a first position in which a contact surface (38) of the first contact member (32) is in electrical contact with a contact surface (42) of a respective second contact member (36) and a second position in which the contact surfaces are not in electrical contact. The path is approximately normal to the contact surfaces, and the operating member has a surface (44) to impart movement to the first contact member in one or both directions.

15 Claims, 3 Drawing Sheets

ELECTRICAL ROTARY SWITCH

BACKGROUND OF THE INVENTION

This invention relates to electrical switches.

The background to the invention will be explained with reference to a particular application. Other applications will readily occur to the reader.

Motor vehicles are increasingly being fitted with air bags which expand, in the event of a collision, to protect the driver or passenger from impact with hard parts of the structure. In normal use, the bag would inflate and the occupant of the vehicle would then be thrown onto it. If, however, the bag were obstructed during inflation, the inflation pressure would be applied to the obstruction. The pressure although not great is sufficiently high to injure a person if s/he were to obstruct the inflating bag. In order to deploy the air bag in sufficient time to be of use, it must be expanded extremely quickly, so a person does not have the opportunity to get out of the way of an accidental inflation. This is of concern to motor mechanics, for example, who may have to work in the space into which the bag would inflate. It is desired, therefore to be able to deactivate the bag inflating mechanism. Another circumstance in which it would be desirable to deactivate the inflating mechanism, is when a rear-facing child's seat is carried on the front passenger seat of a motor car. It is desired that a switch for such purposes should be both inexpensive and highly reliable so that a mechanic, for example, can be sure the inflation mechanism is deactivated when working on the vehicle and so that the driver or passenger can be sure that the mechanism is properly reactivated. Conventional rotary switches either use a barrel cam arrangement to operate the contacts, or a moving contact wipes one or more fixed contacts, which would require contacts to be thickly gold plated or solid, for example, for reliability. Both arrangements would be undesirably expensive.

Against this background, there is provided an electrical rotary switch, having a rotary operating member mounted for rotation about an axis, at least one first contact member mounted for movement in opposed directions along a path transverse to but not intersecting the axis, between a first position in which a contact surface of the first contact member is in electrical contact with a contact surface of a respective second contact member and a second position in which the contact surfaces are not in electrical contact, the path being approximately normal to the contact surfaces, and the operating member having a surface to impart movement to the first contact member in one or both directions.

Since the path of movement is approximately normal to the contact surfaces, excessive wiping is avoided and reliability can be achieved with an inexpensive gold flashing, for example.

Reliability can be increased in a preferred embodiment, wherein said first contact member is resiliently flexible and wherein in said first position the operating member surface flexes the first contact member so as to apply pressure between the first and second contact members. The arrangement may provide significant pressure between the contact surfaces and a small degree of wiping in order to keep them clean. In this arrangement, index means is preferably provided to restrain the operating member in said first position and said second position. The index means counters the pressure of the first contact member.

In one convenient arrangement, the first contact member extends approximately parallel to but displaced from the axis.

In distinction from a conventional cam operated switch in which the cam extends generally in a plane transverse to the axis, said operating member surface preferably extends in a plane approximately parallel to the axis.

In one proposal, the operating member comprises: a body portion having an axial pin projecting from one side of said body, said pin being received by a hole in a stator so as to mount the body for rotary movement about the pin; and an arm spaced from said pin and extending in a longitudinal direction from said one side of the body, the arm providing said surface.

In that proposed arrangement, the arm is preferably generally L-shaped in section, having one portion extending in a direction approximately parallel to the axis, and another portion extending in a direction transverse to the axis and spaced from the body, said surface being provided on said other portion.

In order to reduce the possibility of the air bag mechanism being deactivated while the vehicle is being driven, the operating member is preferably movable by means of a removable key. In that case, the key can preferably only be removed in one of said first and second positions.

BRIEF DESCRIPTION OF THE DRAWINGS

One embodiment of the invention, given by way of example only, will now be described with reference to the accompanying drawings, in which.

DESCRIPTION OF THE PREFERRED EMBODIMENTS

Figure 1:
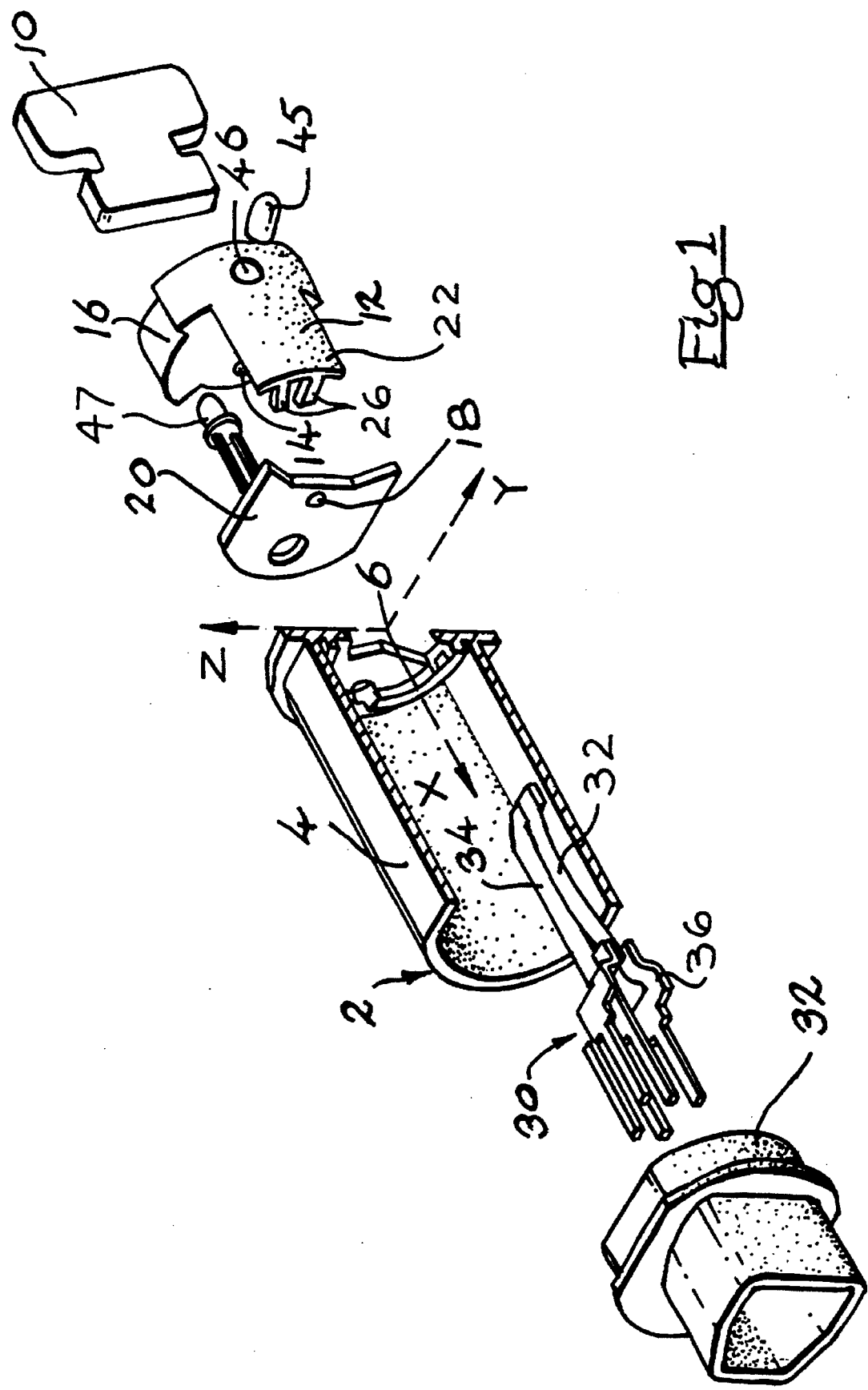
FIG. 1 is an exploded pictorial view, partly broken away, of an electrical switch embodying the invention.

The switch shown in the drawings has a case 2 which is in the general form of a hollow cylinder, but has flats 4 on opposed sides. One end of the case 2 is closed by an integral plate 6 having an aperture 8 for a key 10.

A rotor 12 is mounted for limited rotation about an axis "X" in the casing by an integral pin 14 which extends from one side of a rotor body 16. The pin is received by a hole 18 in a bearing plate 20 which is assembled in the casing behind the integral end plate 6 so that the rotor is rotatable therebetween.

Extending past the bearing plate, the rotor has an arm 22. This is generally L-shaped in section having a portion 24 extending from the body 16 approximately parallel to and spaced from the axis "X". The arm 22 has two portions 26 spaced from the body extending transverse to the axis "X".

Figure 2:
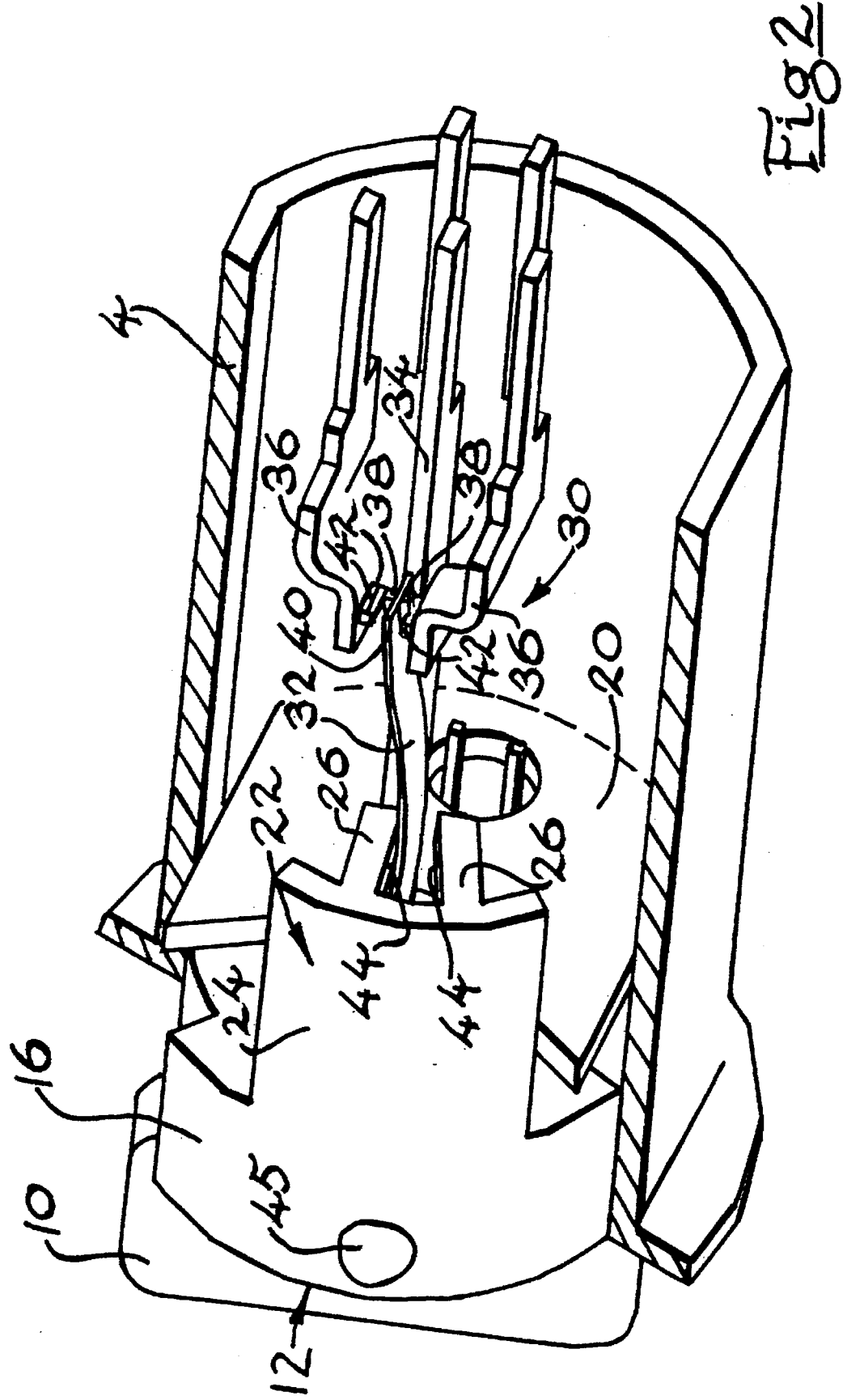
FIG. 2 is a pictorial view, partly broken away, to show the interior of the switch of FIG. 1 when assembled.
Figure 3:
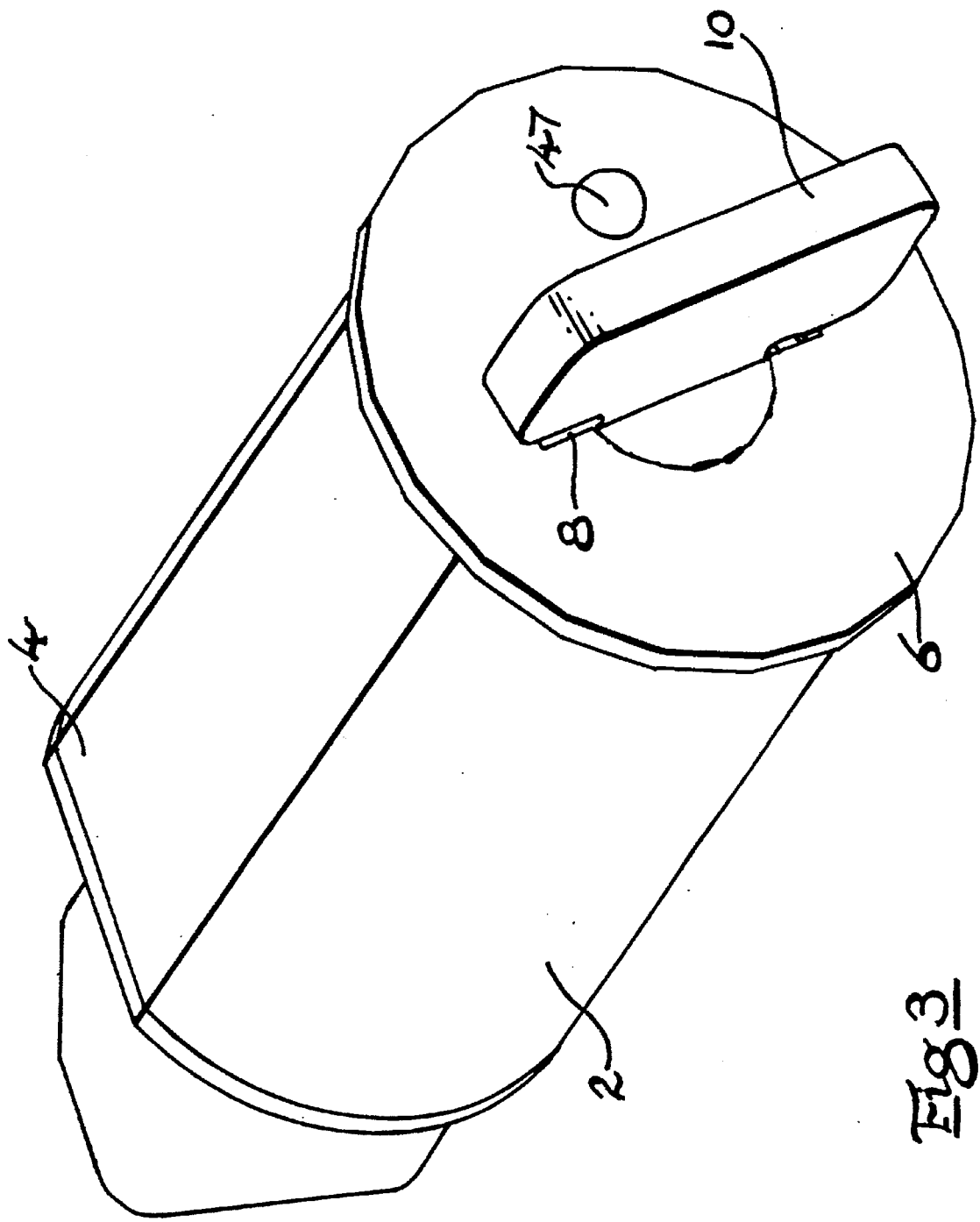
FIG. 3 is a pictorial view of the outside of the switch of FIG. 1.

A contact assembly 30 is carried by an end plug 32 which is assembled in the open end of the casing so positioning the contacts as shown in FIG. 2. A central moving contact member 32 is carried by a generally L-shaped arm 34 which positions the moving contact member 32 between the two portions 26 of the arm 22. Fixed contact members 36 are positioned one each side of the moving contact member 32. The moving contact member 32 carries wire contacts 38 one on each side of its free end 40. Wire contacts 42 are also provided on each of the fixed contact members 36. The wire contacts 38 are oriented approximately at right angles to the contacts 42. The surfaces of contacts 38 and 42 are gold flashed to improve the reliability of electrical contact therebetween.

The contact member 32 is resiliently flexible, e.g. being made of phosphor bronze, and is positioned approximately parallel to but spaced from the axis "X" so that the contacts 38 move in a path which is transverse to but does not intersect the axis "X". Rotation of the rotor thus brings a surface 44 of one or other portion 26 of the arm 22, to bear against the moving contact member 32. The surfaces 44 extend generally in respective planes parallel to the axis "X". Depending on the direction of movement of the rotor, one or other of the contact pairs 38, 42 will break before the other pair makes.

A spring loaded index plunger 45 extends from a cavity 46 in the body 16. The plunger has a domed outer end for engagement in two opposed cavities (not shown) in the inner wall of the case 4. The cavities define positions for the rotor in which the moving contact member 32 is flexed producing pressure between the made contact pair 38 and 42 so as to improve reliability. The general direction of movement between the contacts 38 and 42 is normal to the surfaces which engage, so avoiding a degree of wiping between the surfaces which would remove the gold flashing. However, as the moving contact member 32 is flexed after the contacts have initially made, the contacts 38 and 42 move a small amount producing sufficient wiping action to ensure they remain clean, and so further improving reliability.

In order to reduce the risk of the vehicle being unintentionally driven with the air bag inflation mechanism being disabled, in one position of the rotor, an LED 47 is illuminated. The key aperture 8 is positioned so that when the rotor is in one of the indexed positions corresponding to the air bag inflating mechanism being enabled, the key can be inserted through the aperture into a slot (not shown) in the rotor 16. The rotor can then be rotated with the key to the other (disabling) indexed position. The key aperture 8 is of such a shape that in that other position, the key cannot be removed. It is intended to mount the switch in a prominent position in the vehicle and to manufacture the key in a signal colour.

Although a single pole arrangement has been described, a multi pole arrangement could be provided.

I claim:

1. An electrical rotary switch comprising a casing having front and rear ends, a rotary operating member mounted for rotation about an axis extending between said front and rear ends, said operating member being manually operable from a position on said axis at said front end, a first elongated and flexible contact member having an axis of elongation parallel to said axis mounted for movement in opposed directions along a path transverse to but not intersecting the axis, between a first position in which a first contact surface of the first contact member is in electrical contact with a second contact surface of a respective second contact member and a second position in which the contact surfaces are not in electrical contact, the path being approximately normal to the contact surfaces, and the operating member having an abutment surface movable in said opposed directions as the operating member rotates to impart movement to the first contact member in one or both directions.

2. An electrical switch as claimed in claim 1, wherein said first contact member is resiliently flexible and wherein in said first position the operating member surface flexes the first contact member so as to apply pressure between the first and second contact members.

3. An electrical switch as claimed in claim 2, including index means to restrain the operating member in said first position or said second position.

4. An electrical switch as claimed in claim 1, wherein the first contact member extends approximately parallel to but displaced from the axis.

5. An electrical switch as claimed in claim 1, wherein said operating member surface extends in a plane approximately parallel to the axis.

6. An electrical switch as claimed in claim 5, in which the operating member comprises: a body portion having an axial pin projecting from one side of said body, said pin being received by a hole in a stator so as to mount the body for rotary movement about the pin; and an arm spaced from said pin and extending in a longitudinal direction from said one side of the body, the arm providing said surface.

7. An electrical switch as claimed in claim 6, wherein the arm is generally L-shaped in section, having one portion extending in a direction approximately parallel to the axis, and another portion extending in a direction transverse to the axis and spaced from the body, said surface being provided on said other portion.

8. An electrical switch as claimed in claim 1, wherein the operating member is configured to receive a removable key.

9. An electrical switch as claimed in claim 8, wherein said casing has an aperture configured so that the key can only be removed when said contact member is in one of said first and second positions.

10. An electrical switch as claimed in claim 1, including a respective third contact member, said first contact member having a contact surface which is in electrical contact with a contact surface of the third contact member when the first contact member is in its second position, and which is not in electrical contact with the contact surface of the third contact member when the first contact member is in its first position.

11. An electrical switch as claimed in claim 1 wherein said rotary member comprises a section of a hollow cylinder concentric with said casing and movable along an inside surface of said casing, and said abutment surface is on an arm extending inwardly from an inside surface of said rotary member for engagement with said contact member.

12. An electrical switch as claimed in claim 11 including an electrically operated signal light visible at the front end of the switch, said light having a pair of elongated terminals extending past said rotary member and generally parallel to the axis thereof for being electrically energized when said contact member is in one of said first and second positions.

13. An electrical switch as claimed in claim 1 wherein said first contact member is of generally U-shape including a first leg extending forwardly from said casing rear end and a second leg extending rearwardly from a first, front end of said first leg and terminating at a second, rear end spaced from said casing rear end, said first contact surface being disposed at said rear end of said second leg.

14. An electrical switch as claimed in claim 13 wherein said second contact member is secured to said casing rear end and extends forwardly therefrom to a position adjoining said first contact surface of said first contact member.

15. An electrical switch as claimed in claim 14 including a third contact member having a third contact surface thereon for being contacted by a fourth contact surface of said first contact member when in said second position, said third contact member being secured to said casing rear end and extending forwardly therefrom to a position adjoining said fourth contact surface of said first contact member, said first and fourth contact surfaces of said first contact member being disposed on oppositely disposed surfaces of said first contact member second leg at said second end thereof.

* * * * *